(12) United States Patent
Van Den Beukel et al.

(10) Patent No.: US 7,242,637 B2
(45) Date of Patent: Jul. 10, 2007

(54) TIME-LAPSE SEISMIC SURVEY OF A RESERVOIR REGION

(75) Inventors: Annemieke Catelijne Van Den Beukel, Rijswijk (NL); Paul James Hatchell, Rijswijk (NL); Cornelis Jan Kenter, Rijswijk (NL); Karel Peter Maron, Rijswijk (NL); Menno Mathieu Molenaar, Rijswijk (NL); Johannes Gijsbertus Franciscus Stammeijer, Aberdeen (GB)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/971,883

(22) Filed: Oct. 22, 2004

(65) Prior Publication Data

US 2005/0149267 A1 Jul. 7, 2005

Related U.S. Application Data

(60) Provisional application No. 60/513,955, filed on Oct. 24, 2003.

(51) Int. Cl.
*G01V 1/28* (2006.01)
*G01V 1/30* (2006.01)

(52) U.S. Cl. .............. 367/38; 367/37; 367/73
(58) Field of Classification Search .......... 367/27, 367/37–38, 46–47, 56–57, 73; 702/13, 16
See application file for complete search history.

(56) References Cited

U.S. PATENT DOCUMENTS

| | | | |
|---|---|---|---|
| 5,081,612 A | 1/1992 | Scott et al. | |
| 5,200,929 A | 4/1993 | Bowers | 367/38 |
| 5,615,115 A | 3/1997 | Shilling | |
| 5,724,311 A * | 3/1998 | Laurent et al. | 367/57 |
| 5,859,367 A | 1/1999 | Holbrook | |
| 5,946,271 A | 8/1999 | Dragoset, Jr. | 367/38 |
| 6,041,018 A * | 3/2000 | Roche | 367/46 |
| 6,389,361 B1 * | 5/2002 | Geiser | 702/15 |

(Continued)

FOREIGN PATENT DOCUMENTS

WO 2005/040860 A1 6/2005

OTHER PUBLICATIONS

Olden, et al. "modeling combined fluid and stress change effects in the seismic response of a producing hydrocarbon reservoir." The Leading Edge, Oct. 2001.*

(Continued)

*Primary Examiner*—Jack Keith
*Assistant Examiner*—Scott A. Hughes

(57) ABSTRACT

A method of investigating a reservoir region in a subsurface formation by a time-lapse seismic survey. The subsurface formation comprises a further formation region adjacent to the reservoir region. Data are obtained from a time-lapse seismic survey and includes seismic data of the subsurface formation at a first point in time and a later point in time. The seismic data is processed to obtain a seismic representation of change in a predetermined seismic parameter in the further formation region, whereby the seismic parameter is dependent on stress. The seismic representation of change in the seismic parameter in the further formation region is interpreted for an indication of changes of stress distribution in the further formation region, and a property of the reservoir region is derived using the indication of change of stress distribution in the further formation region.

20 Claims, 7 Drawing Sheets

U.S. PATENT DOCUMENTS

| | | | |
|---|---|---|---|
| 6,434,487 | B1 | 8/2002 | Thompson |
| 6,438,069 | B1 * | 8/2002 | Ross et al. .................... 367/73 |
| 6,529,833 | B2 * | 3/2003 | Fanini et al. ................... 702/7 |
| 6,614,717 | B1 * | 9/2003 | Khan et al. .................... 367/46 |
| 6,715,551 | B2 * | 4/2004 | Curtis et al. ........... 166/250.16 |
| 6,894,949 | B2 * | 5/2005 | Aronstam .................... 367/57 |
| 2002/0128777 | A1 | 9/2002 | Fanini et al. ................. 702/11 |
| 2003/0125878 | A1 | 7/2003 | Bakulin et al. |

OTHER PUBLICATIONS

Biot MA, Theory of Propagation of Elastic Waves in a Fluid-Saturated Porous Solid: I Low Frequency Range, Journal of the Acoustical Society of America, vol. 28, pp. 168-178 (1956).

Biot MA: Theory of Propagation of Elastic Waves in a Fluid-Saturated Porous Solid: II Higher Frequency Range, Journal of the Acoustical Society of America, vol. 28, pp. 179-191 (1956).

4D constrained depth conversion for reservoir compaction estimation: Application to Ekofisk Field by J. Guilbot and B. Smith, The Leading Edge, Mar. 2002, pp. 302-308.

A.. Khaksar and C. M. Griffiths, "Influence of Effective Stress on the Acoustic Velocity and Log Derived Porosity", National Centre for Petroleum Geology and Geophysics, pp. 173-181.

Martin Landro, "Discrimination Between Pressure and Fluid Saturation Changes from Time-Lapse Seismic Data", Geophysics, vol. 66, No. 3, pp. 836-844.

Search Report dated Oct. 22, 2004.

I. S. Bell, "Rock at Great Depth", Maury & Fourmaintraux (Eds.) 1990 Balkema, Rotterdam, pp. 1243-1261.

Jean-Paul Mouchet and Alan Mitchell, "Abnormal Pressures While Drilling", Boussens, 1989, p. 76.

* cited by examiner

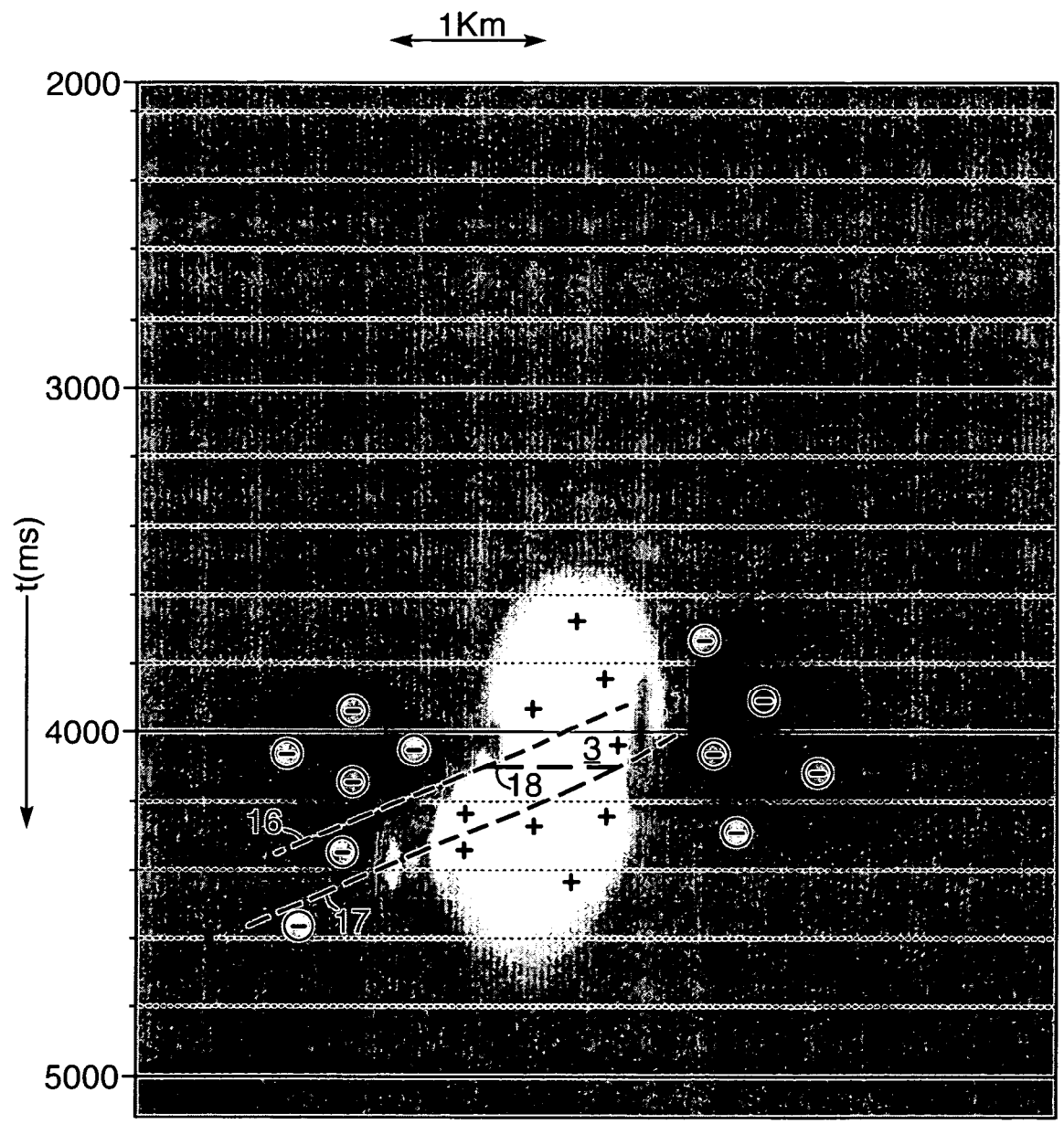

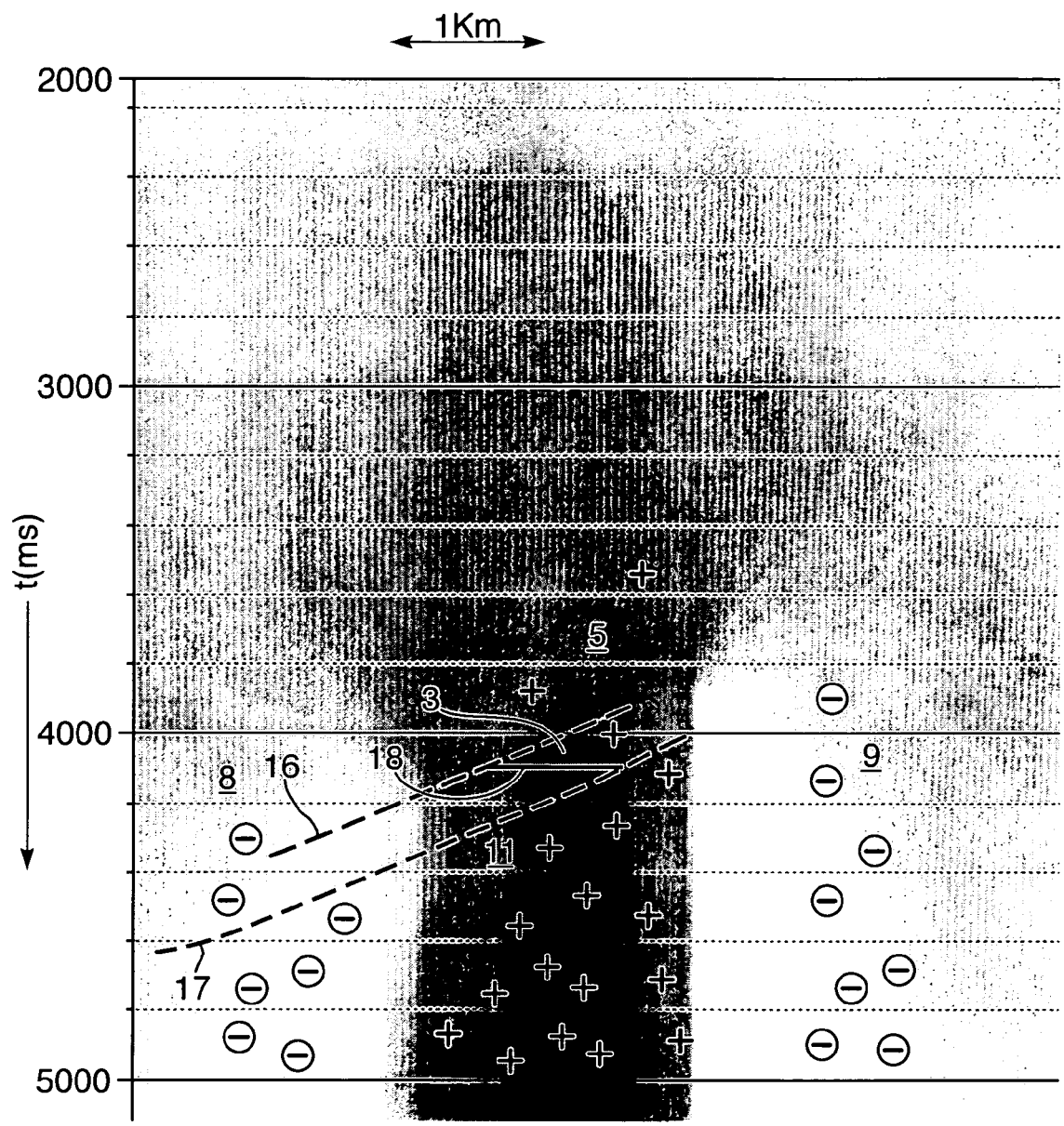

TIME-LAPSE SEISMIC SURVEY OF A RESERVOIR REGION

CLAIM TO PRIORITY

This application claims priority based on U.S. Provisional Patent Application No. 60/513,955, filed Oct. 24, 2003.

FIELD OF THE INVENTION

The present invention relates to a method of investigating a reservoir region in a subsurface formation using a time-lapse seismic survey.

BACKGROUND OF THE INVENTION

Time-lapse seismic surveying is increasingly used for studying of earth formations. It is applied for monitoring of hydrocarbon bearing underground reservoirs, in particular to follow the effects resulting from producing reservoir fluids (e.g. oil, gas, water) through a well to surface.

In time-lapse seismic surveying, seismic data are acquired at least two points in time. Time is therefore an additional parameter with regard to conventional seismic surveying. This allows studying the changes in seismic properties of the subsurface as a function of time due to, for example, spatial and temporal variation in fluid saturation, pressure and temperature. Time-lapse seismic surveying is also referred to as 4-dimensional (or 4D) seismics, wherein time between acquisitions represents a fourth data dimension. Like in conventional seismic surveying, the three other dimensions relate to the spatial characteristics of the earth formation, two being horizontal length dimensions, and the third relating to depth in the earth formation, which can be represented by a length coordinate, or by a time coordinate such as the two-way travel time of a seismic wave from surface to a certain depth and back.

The acquisition and initial processing of the seismic data can be done by standard seismic techniques. The time span between the first and the second point in time at which seismic data are acquired can be several years. One normally tries to acquire the first and second seismic data sets in a similar way, so that they are best comparable. If that is not fully possible, differences in acquisition can be accounted for during processing.

Seismic surveying techniques investigate the earth formation by generating seismic waves in the earth formation, and measuring the time the waves need to travel between one or more seismic sources and one or more seismic receivers. The travel time of a seismic wave is dependent on the length of the path traversed, and the velocity of the wave along the path.

A general difficulty in seismic surveying of oil or gas fields is that the reservoir region normally lies several hundreds of meters up to several thousands of meters below the earth's surface, but the thickness of the reservoir region or layer is comparatively small, i.e. typically only several meters or tens of meters. Resolution of processed seismic data in the reservoir region is therefore an issue. Resolution requirements are even higher when small differences in time-lapse seismic surveys are to be detected and interpreted.

The paper "4D constrained depth conversion for reservoir compaction estimation: Application to Ekofisk Field" by J. Guilbot and B. Smith, The Leading Edge, March 2002, p. 302-308, discloses a method for interpreting a time-lapse seismic survey of a subsea earth formation, in order to determine reservoir compaction as a result of production and water flooding. Seismic data were acquired at a first and a second point in time, separated by about 10 years. The seismic data were interpreted at the hand of a model of the earth formation, which consisted of, consecutively from bottom to top, a lower reservoir layer, an upper reservoir layer, an overburden layer and a seawater layer. The model included the depth of the boundaries between adjacent layers and the seismic velocity in each of the layers. It was found that in order to interpret the compaction of the reservoir correctly, it is required to take into account the changes in the seismic velocity in the various earth layers between the first and second points in time.

Among the interesting questions to be answered in a time-lapse seismic survey of a producing reservoir is about inhomogeneous depletion of the reservoir during production, caused e.g. by the presence of a discontinuity or fault that seals a certain part of the reservoir from those parts which are in direct fluid communication with the production well. Whereas the resolution of the processed seismic data is often just sufficient to obtain a more or less clear indication of the presence of a discontinuity or fault, differences observed in the reservoir region in a time-lapse seismic survey (e.g. amplitude or interval velocity changes) are generally so small that it proves to be very difficult to draw reliable conclusions about the sealing nature of the fault.

There is a need for a method of interpreting time-lapse seismic data, which allows one to obtain more detailed information about certain parameters and conditions of the reservoir region, and it is an object of the present invention to provide such a method.

SUMMARY OF THE INVENTION

The present invention provides a method of investigating a reservoir region in a subsurface formation using a time-lapse seismic survey, wherein said subsurface formation comprises a further formation region adjacent to the reservoir region, said method comprising the steps of:

obtaining data from a time-lapse seismic survey including seismic data of the subsurface formation at a first point in time and a later point in time, processing the seismic data to obtain a seismic representation of change in a predetermined seismic parameter in the further formation region, said seismic parameter being dependent on stress;

interpreting the seismic representation of change in the seismic parameter in the further formation region for an indication of changes of stress distribution in the further formation region; and deriving a property of the reservoir region using the indication of change of stress distribution in the further formation region.

BRIEF DESCRIPTION OF THE DRAWINGS

The present invention will now be explained in more detail with reference to the drawings, wherein

FIG. 8 shows the change in two-way travel time as determined on the basis of the stress field of FIG. 7; and FIG. 9 shows the change in two-way travel time determined on the basis of seismic data.

DETAILED DESCRIPTION OF PREFERRED EMBODIMENT

Figure 1:
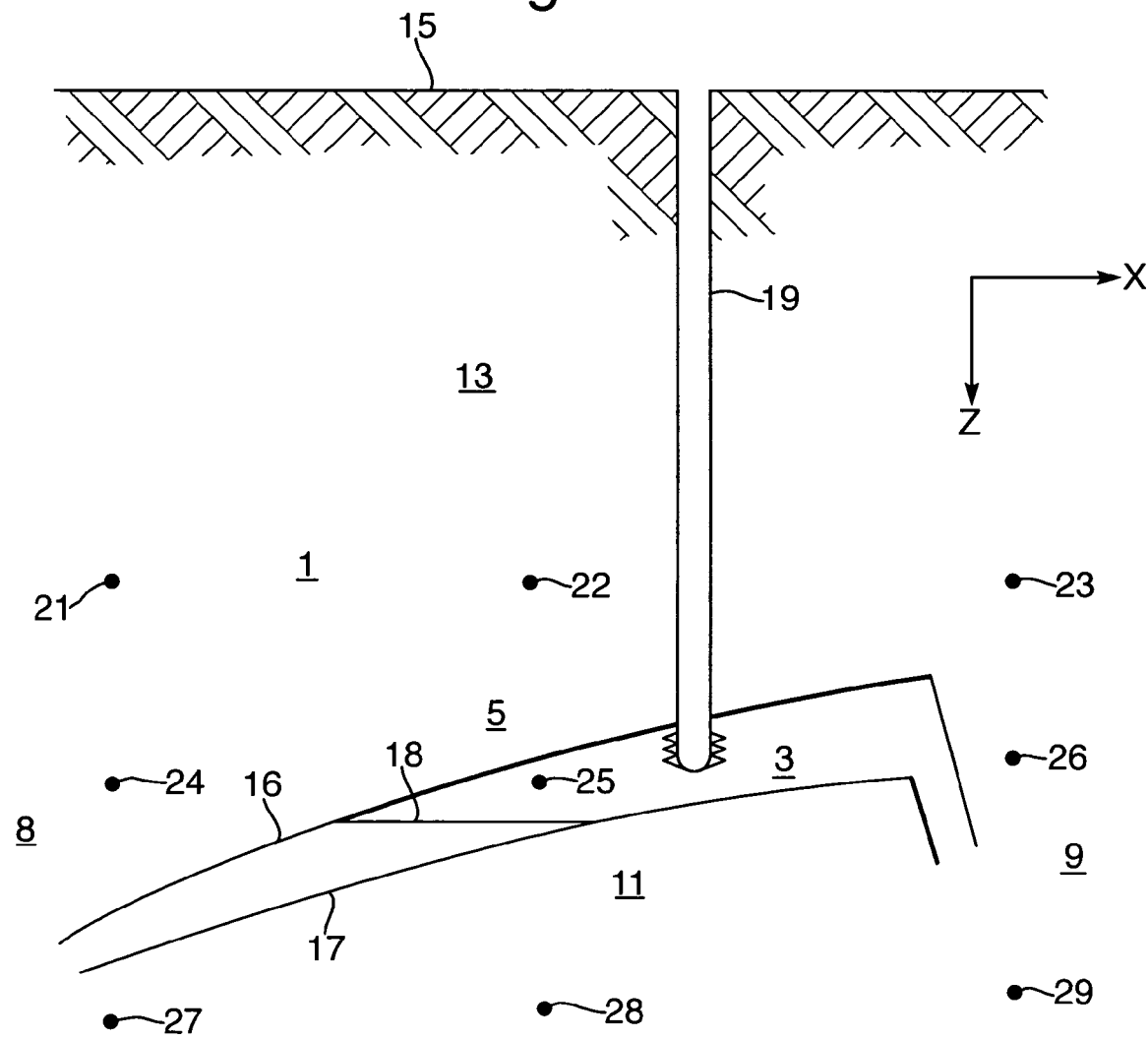
FIG. 1 shows schematically a geometrical model of a subsurface formation with a reservoir region.

The present invention is based on the insight gained by applicant that changes in the reservoir pressure give rise to changes in stress in formation regions adjacent to the reservoir region. Since the change in stress in general causes a change in seismic velocity, the change in stress is observable in seismic parameters, such as in the two-way travel time, outside the reservoir region.

For example, it was realized that depletion in the reservoir region could result in so-called stress arching. Stress arching occurs when a reservoir region is locally compacting, e.g. due to lowering of pore pressure, and when the overburden as a result transfers part of its weight to non compacting or less compacting formation regions laterally surrounding the compacting reservoir region, which results in an arch-like curved distribution of stress.

One element of the present invention is the recognition that stress distribution changes extend, and are observable in seismic parameters, over much longer distances (both vertical and horizontal) in the formation regions surrounding the reservoir region than the order of magnitude of actual displacements of formation boundaries causing the changes in stress distribution, and also generally larger than the height of the reservoir region. It is therefore possible to detect a condition in the reservoir region by analysing the time-lapse seismic data outside the reservoir region.

Suitably, the seismic data is processed to obtain a seismic representation of the subsurface formation such as a seismic image, in which the formation region is identified. The seismic representation of the subsurface formation in the reservoir region is then interpreted together with the indication of changes of stress distribution in the further formation region in order to derive the property of the reservoir region.

Suitably the interpretation of changes in the stress distribution makes use of a geomechanical simulation of the subsurface formation. Therein a starting model of the subsurface formation is used that suitably includes a geometrical model of the regions and region boundaries in the subsurface formation at the first point in time, an estimate of mechanical rock properties of each region in the geometrical model, and for rock that exhibits non-linear elastic behaviour an estimate of stress in the reservoir region and in the further formation region at the first point in time.

Further, the change in pore pressure in at least part of the reservoir region can be estimated, suitably using reservoir simulation. A geomechanical simulation can then calculate the effects of a change in pore pressure and pore-pressure distribution on the position of boundaries and the stress distribution in the subsurface formation, including the regions outside the reservoir region. In this way a geomechanical representation of changes in stress in the reservoir region and in the further formation region, and of displacements of region boundaries is obtained.

In a further step, the results of the geomechanical simulation can be used to predict the effects of displacements and of the change in stress on the predetermined seismic parameter, so that a geomechanical representation of the change in the seismic parameter is obtained.

The seismic and geomechanical representations of the changes in the seismic parameter can then be compared in order to interpret the time-lapse seismic survey. If there is good agreement between the seismic and geomechanical representations, then this is a validation of parameters used in the geomechanical model, and optionally reservoir model, in particular of the estimated pore pressure change. If there are differences, then an updated geomechanical representation can be determined, if needed in an iterative process, by changing parameters used in the geomechanical simulation and/or reservoir simulation of the subsurface formation. In particular, an improved estimate of the change in pore pressure in at least part of the reservoir region can be obtained. Thus, the method of the present invention can be used to investigate quantitative properties of the reservoir region. It will be understood, that also qualitative properties of the reservoir region can be derived, such as the sealing nature of a fault or discontinuity in the reservoir region, or the presence of areas in the reservoir that are undepleted or less depleted during production from the reservoir.

The total stress at a certain location in the subsurface formation is counteracted to some degree by the pore pressure. This leads to the definition of an effective stress that is the difference between the total stress and a term proportional to the pore pressure.

When the fluid pressure in a reservoir region is reduced, the effective stress field in and around the reservoir region changes, and the reservoir rock undergoes some degree of compaction. The change in the effective stress can be described by the equation:

$$\Delta\sigma^{eff} = \Delta\sigma - \alpha\Delta P, \qquad (1)$$

wherein $\sigma^{eff}$ is the effective stress tensor, $\sigma$ is the total stress tensor, $\alpha$ is the so-called Biot alpha coefficient and is generally in the order of one, and P is the fluid pressure. The sign $\Delta$ is used to refer to a difference between a later and a first point in time. The sign convention used in equation 1 is that compressive stresses are negative. Biot showed that the composite properties could be determined from the porosity and the elastic properties (density and moduli) of the fluid, the solid material, and the empty rock skeleton, or framework. To account for different frequencies of propagation, it is also necessary to know the frequency, the permeability of the rock, the viscosity of the fluid and a coefficient for the inertial drag between skeleton and fluid.

The Biot theory takes into account frequency variations, and allows for relative motion between fluid and rock framework. As a result, it predicts some of the observed changes in velocity with frequency. It also predicts the existence of a so-called slow wave in addition to the shear wave and the compressional, or fast wave. The slow wave arises when the fluid and the skeleton move 1800 out-of-phase with each other. In permeable formations, the Stoneley wave couples into the slow wave, causing the attenuation and dispersion that allow the measurement of Stoneley permeability. See, Biot M A, *Theory of Propagation of Elastic Waves in a Fluid-Saturated Porous Solid: I Low Frequency Range*, Journal of the Acoustical Society of America, Vol. 28, pp. 168-178 (1956); Biot M A: *Theory of Propagation of Elastic Waves in a Fluid-Saturated Porous Solid: II Higher Frequency Range*, Journal of the Acoustical Society of America, Vol. 28, pp. 179-191 (1956).

The change in the total stress, $\Delta\sigma$, is determined by how the overburden and underburden respond to the compacting reservoir. This depends on many physical properties including the rock mechanical properties of the reservoir and non-reservoir rocks and the geometry of the reservoir.

It is illustrative to consider the vertical components (index zz) of equation 1, which can be written as:

$$\Delta \sigma_{ZZ}^{\text{eff}} = \Delta \sigma_{ZZ} - \alpha \Delta P = (\gamma_Z - \alpha) \Delta P. \quad (2)$$

The term $\gamma_z$ as defined by equation (2) is referred to as the vertical stress-arching coefficient, and can be used for characterizing how the change in total vertical stress is related to the change in reservoir pressure. For an infinite or very large horizontal reservoir undergoing uniform depletion the stress-arching coefficient will be zero, and the change in the effective vertical stress will be the Biot alpha coefficient times the negative of the change in fluid pressure. For a finite-sized reservoir region, the value of $\gamma_z$ depends on the geometry of the reservoir region. $\gamma_z$ can typically have values in the range of 0.05-0.8. Biot theory is use for acoustic propagation in a porous and elastic medium developed by M. A. Biot. Compressional and shear velocities can be calculated by standard elastic theory from the composite density, shear and bulk modulus of the total rock. The problem is how to determine these from the properties of the constituent parts.

Reference is made to FIG. 1, showing schematically an example of a subsurface formation 1 comprising a reservoir region 3 having a reservoir pressure and further formation regions 5, 8, 9, 11, adjacent to the reservoir region. Region 5 is the lowest part of the overburden 13 extending from the top of the reservoir region to the earth's surface 15. Regions 8 and 9 are laterally adjacent to the reservoir region 3, and region 11 below the reservoir region is referred to as the underburden. The reservoir region 3 is separated from the over- and underburden by layer boundaries 16,17. A water contact is shown at reference numeral 18.

The reservoir region contains fluid, a hydrocarbon oil, gas, and/or water, having a reservoir pressure, and which is produced to the surface through a wellbore 19.

It will be understood that any of the regions 3, 5, 8, 9, 11, 13 can comprise a plurality of individual formation layers.

FIG. 1 also shows 9 points 21, 22, 23, 24, 25, 26, 27, 28, 29 at various positions in several regions of the subsurface formation, which will be used as reference points in subsequent Figures.

Time-lapse seismic surveying or monitoring involves acquiring seismic data of the same part of the subsurface at different times. It allows studying of the changes in seismic properties of the subsurface as a function of time.

Acquiring time-lapse seismic data generally includes acquiring seismic data at a first point in time, by arranging a seismic receiver at a predetermined position; positioning a seismic source at a location having a predetermined position, and recording a signal from the seismic receiver in response to a sound wave emitted by the seismic source. Then, at a later point in time such as after one year, seismic data are again acquired, wherein preferably the acquisition is conducted in a similar way as at the first point in time, for reasons of comparability.

It shall be understood that the seismic receiver and/or the seismic source can extend in space and comprise a plurality of seismic receivers or sources. Receiver and/or source can also be arranged in a wellbore.

The two seismic surveys are obtained and compared, and normally images of a predetermined parameter, and/or of a change of this parameter are produced. It is not generally required to derive an image of the subsurface formation or of the change of the seismic parameter. For example it is also possible to place a geophone or a seismic source in a wellbore, at a location in or adjacent to the reservoir region, and to acquire seismic data between this location and another location on surface or in another wellbore. This also allows one to determine a change in a seismic parameter such as of travel time between the locations (thereby traversing the further formation region) over time, without producing an image. A seismic representation of change in a predetermined seismic parameter in the further formation region can then simply be a difference in travel time along a predetermined trajectory.

The method of the present invention can be used for off-line processing and interpreting of time-lapse seismic data obtained from a previous survey at some location, or it can be used as an integral part of performing a time-lapse seismic survey.

Figure 2:
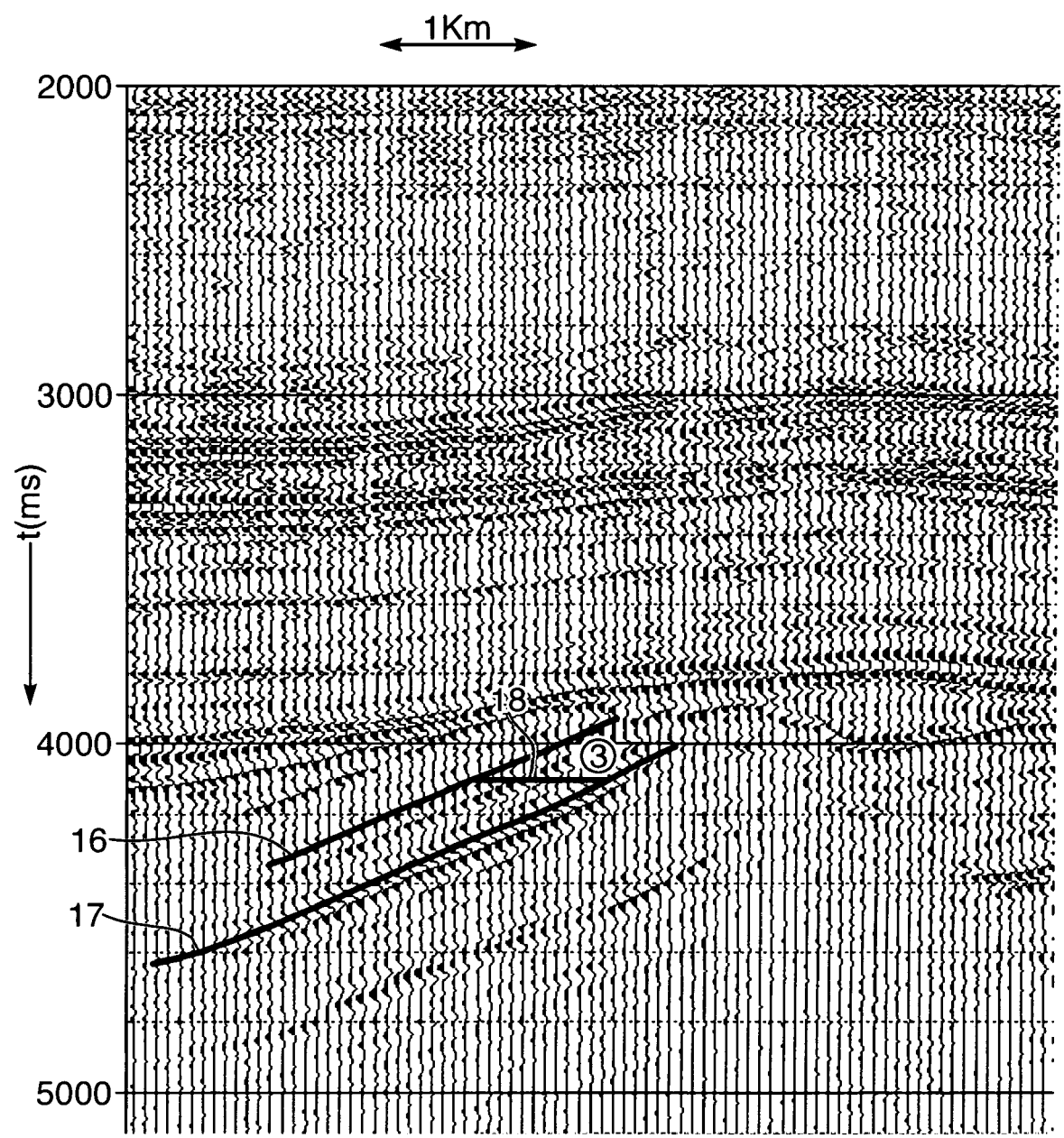
FIG. 2 shows a seismic representation of a subsurface formation.

FIG. 2 shows an example of processed seismic data of the subsurface formation 1, which is a seismic representation of the subsurface formation in the form of a seismic image. The reservoir region 3 is indicated, as well as lines indicating the top of the reservoir 16, base of the reservoir 17 and gas-water contact 18. The horizontal (x) coordinate in FIG. 2 corresponds to the x-coordinate in FIG. 1. The second coordinate t is the two-way travel time of a vertically travelling seismic wave between surface and a certain seismic event, and corresponds to the z-coordinate in FIG. 1. The processed seismic data comprise a plurality of time signatures (N "traces") of seismic waves with different x-coordinates as starting points. The Figure represents the results of a seismic survey $B_i(t)$ at a first point in time $T_1$, which is also referred to as a base survey. The index i represents the number of the trace in the processed seismic data as shown (i=1, ..., N).

For the time-lapse seismic survey, a further ("monitoring") seismic survey $M_i(t)$ is conducted at time $T_2 > T_1$, after some time of producing hydrocarbons from the reservoir region. The monitoring survey looks generally similar to the base survey shown in FIG. 2, however the two-way travel time in a trace to certain events has slightly changed, generally on a timescale of a few milliseconds, as will be pointed out further below in more detail.

There are several methods for estimating the change in two-way travel time. One method is to determine the difference in arrival times of similar trace features of $M_i(t)$ and $B_i(t)$ such as an extremum or a zero-crossing. Another common method is to maximize the normalized cross-correlation function between $M_i(t)$ and $B_i(t)$, in a time-window of width 2 g centered about the travel time T of interest. This can generally be done by finding the maximum of the function:

$$F_i(\tau, T) = \frac{\int_{T-g}^{T+g} M_i(t-\tau) \cdot B_i(t-\tau) dt}{\sqrt{\int_{T-g}^{T+g} M_i^2(t-\tau) dt \cdot \int_{T-g}^{T+g} B_i^2(t-\tau) dt}}. \quad (3)$$

Where the integral (or analogous summation) is taken over a typically narrow range of times centered around the output time sample of interest. Finding the maximum of equation (3) with respect to τ at each time T of interest will estimate the change in the two-way travel time.

Figure 3:
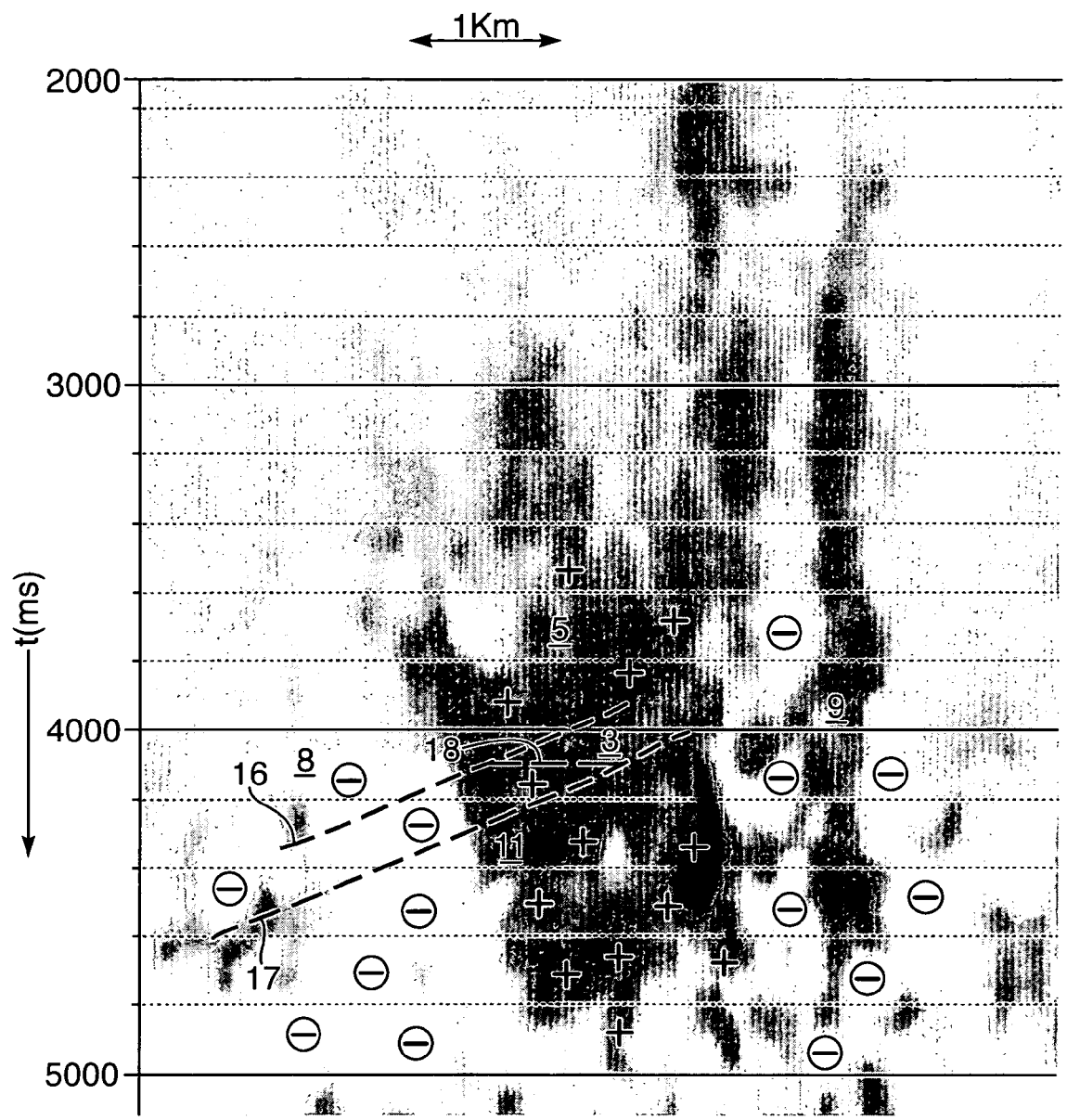
FIG. 3 shows a change in two-way travel time determined from a time-lapse seismic survey of the formation of FIG. 2.

FIG. 3 shows an example of the representation of the change in the two-way travel time obtained in this way, in the form of an image corresponding to the base survey shown in FIG. 2. The monitoring survey was performed about 2 years after the base survey, during which time the reservoir was depleted by some 5000 psi (34.5 MPa). In FIG. 3, the change in two-way travel time is indicated on a gray scale, wherein white corresponds to a decrease in two-way travel time by 2 ms, and black to an increase in two-way travel time by 2 ms. Increase means that the two-way travel time at the second point in time is larger than at the first point in time. For the sake of clarity, "+" signs indicate regions of increase in two-way travel time, and "−" signs indicate regions of decrease.

FIG. 3 shows that the two way travel time increases along a vertical band crossing the reservoir region. Left and right of that band, at the depth of the reservoir region and below are areas of significant decrease of two-way travel time. This is the result of stress arching of the overburden, which will be discussed in more detail below. It is important to note in FIG. 3 that the effects of depletion in the reservoir are visible at long distances outside the reservoir region.

The influence of lowering of pore pressure in the reservoir region on the total vertical stress and effective vertical stress distribution in the formation will now be discussed. A time $T_1$ before production (depletion) starts is considered. The total vertical stress $\sigma_{zz}$ represents the weight of the overburden and can in a simple model be assumed to increase linearly at 22 MPa/km. Pore pressure P in the reservoir region can in a simple model be assumed to be equal to the hydrostatic pressure $P_h$ at the depth of the reservoir, whereby said hydrostatic pressure can be assumed to linearly increase with 10 MPa/km. P is often higher than $P_h$, but it can also be lower. The vertical effective stress $$\Delta\sigma_{zz}^{e\!f\!f}$$

at a certain depth represents the difference between total vertical stress and pressure, see equation (1). Assuming the Biot alpha coefficient to be one, and the pressure in the formation to be the hydrostatic pressure, the effective vertical stress increases by 12 MPa/km in this simple model.

Figure 4:
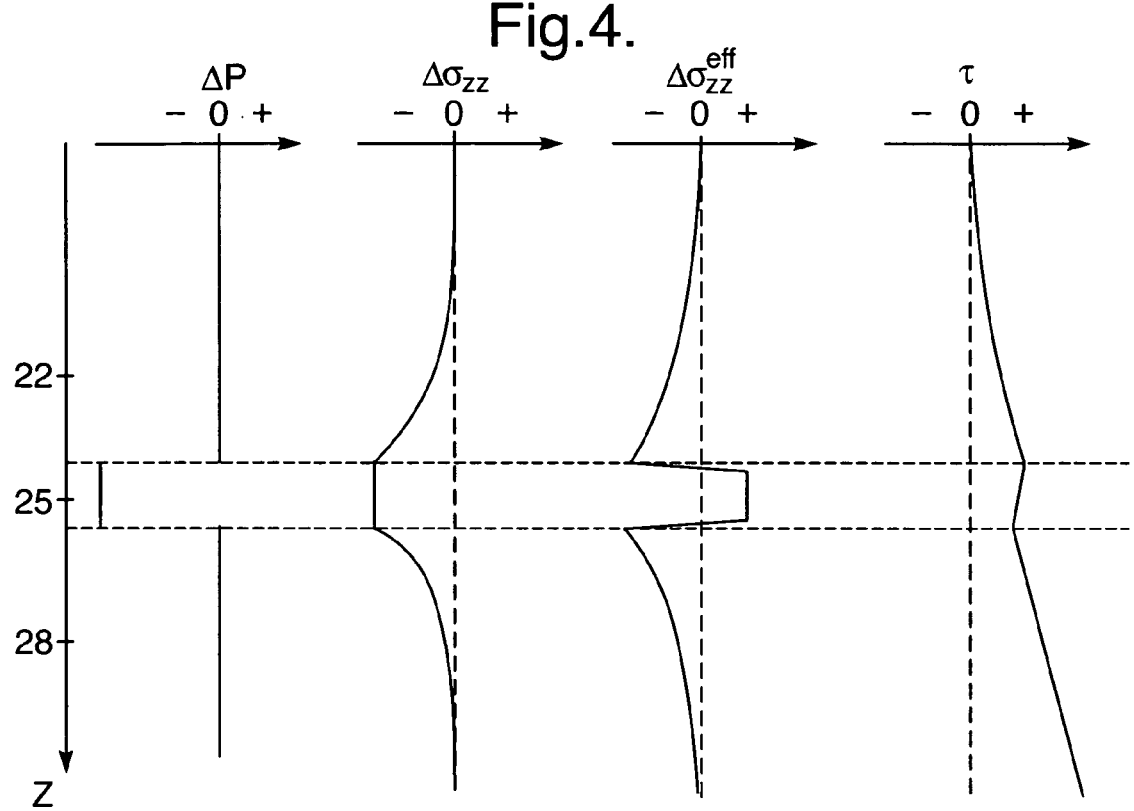
FIGS. 4-6 shows the qualitative magnitude of the change of several quantities as a result of lowering the pore pressure in the reservoir region, along several lines in FIG. 1.
Figure 5:
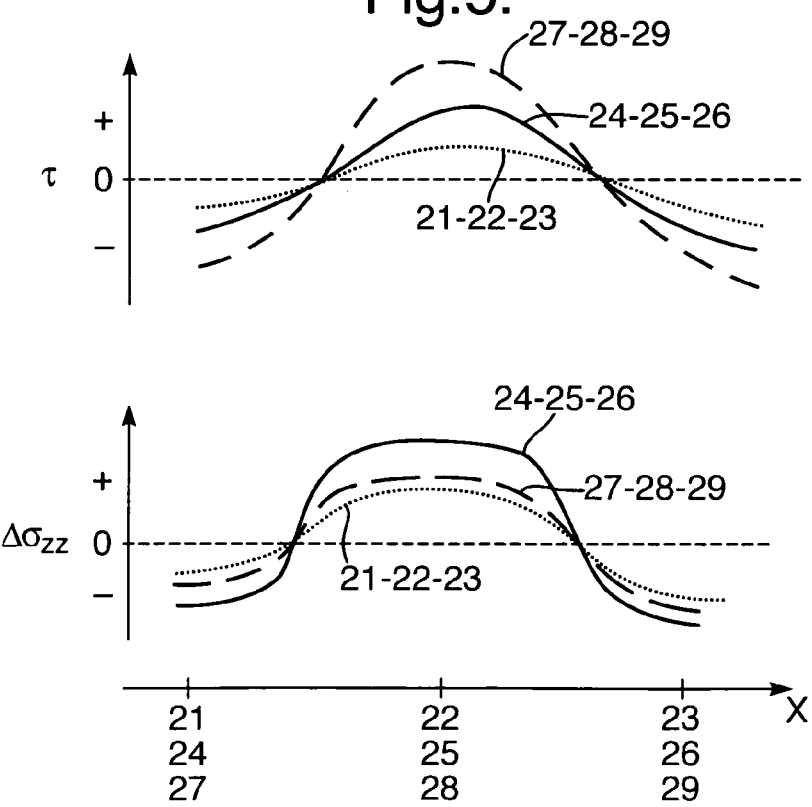
Figure 6:
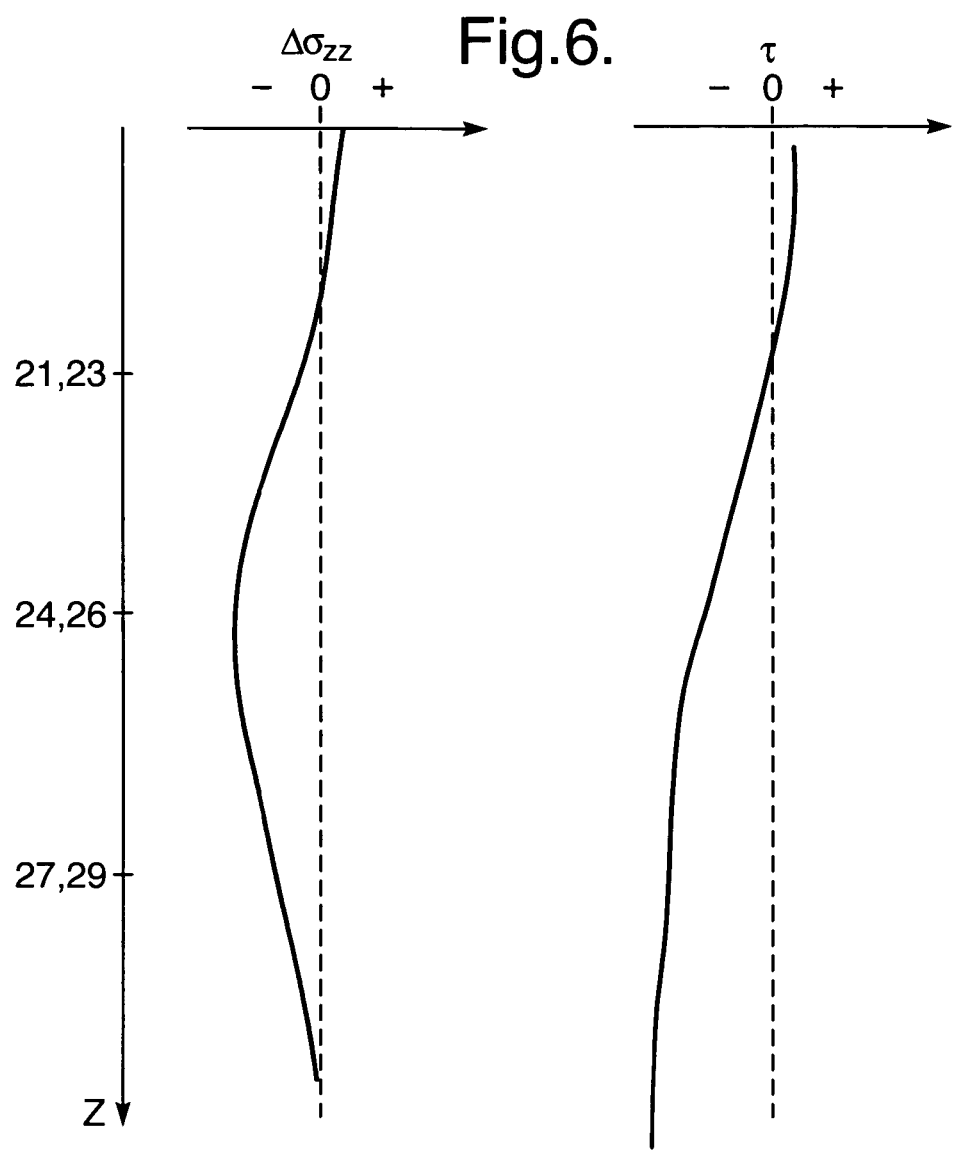

Reference is made to FIGS. 4-6. In these Figures, the effect of a lowering of the fluid pressure in the reservoir region 3 of FIG. 1 on several quantities is shown. Differences between the magnitude of these quantities at time $T_2$ and the magnitude in the initial situation at time $T_1$ are considered. The reference points 21, 22, . . . , 29 are used in FIGS. 4-6 to illustrate the dependence of quantities from the position in the subsurface formation. The scales of the various quantities are qualitative, wherein "+" represents an increase in the numerical value with respect to the initial situation at the first point in time, and "−" represents a decrease.

FIG. 4 displays the dependence of the quantities ΔP (pressure difference), $\Delta\sigma_{ZZ}$ (total vertical stress difference), $$\Delta\sigma_{ZZ}^{e\!f\!f}$$

(vertical effective stress difference), and τ (time shift, i.e. change in two-way travel time), along a vertical line through the reservoir region, along points 21,25,28. The pressure difference ΔP shows a step decrease in the reservoir region.

It was found that a depletion in the reservoir region underneath the overburden results in a change of the vertical effective stress as depicted. The overburden weight is partly transferred to less compacting reservoir compartments or to non compacting formation regions laterally surrounding the reservoir region. The total and vertical effective stress above and below the compacting reservoir region is consequently lower outside of the reservoir region than before depletion, cf. equation 1. Seismic parameters depend on the effective stress. The differences in effective stress therefore result in changes in the two-way travel time to the top reservoir event (boundary 16 in FIG. 1), which is found to increase with respect to the initial situation both above the reservoir region and below the reservoir region.

The changes in the total and effective stress directly above the reservoir region are significant (e.g. a $\gamma_z$ value of 0.2 corresponds to 20 percent of the change in fluid pressure) and decay gradually away from the reservoir. It was found that significant changes in time shifts are observable as far as 500 ms (corresponding to in the order of 0.5 km) above the top reservoir. This illustrates the improvement of the method of the present invention to detect effects in a comparatively thin reservoir layer through stress changes caused in the overburden, even when there is little or no change directly observable in the reservoir region.

FIG. 5 depicts the total vertical stress difference along various horizontal lines that the stress is transferred to the sideburden, cf. regions 8 and 9 in FIG. 1. Stress-arching effects are largest at the depth of the reservoir region (along points 24-25-26), and smaller above and below the reservoir region (along points 21-22-23 and 27-28-29, respectively). This results in changes in two-way travel time as shown, wherein the magnitude of changes increases from above the reservoir to below the reservoir.

For the sake of completeness, FIG. 6 shows the changes in $\Delta\sigma_{ZZ}$ and change T in two-way travel time along the points 21-24-27 and 23-26-29.

FIGS. 4-6 show that the lowering of pore pressure in the formation region results in a significant change of seismic parameters outside the formation region. Such changes allow one to draw conclusions about a condition in the reservoir region. Lowering of reservoir pressure results in a decrease in the compressional stresses of the rocks immediately above and below the reservoir region, and therefore to a lowering of total and effective vertical stresses above and below the reservoir region.

On either side of the depleting reservoir the change in the total vertical stress becomes more compressive. In these zones the compressive stresses increase because they take over some of the weight that was originally supported by rock above the reservoir. Thus vertical stress is distributed to the sideburden (so-called stress-arching).

The method of the present invention can for example be used to identify undepleted areas of a reservoir region, also referred to as undepleted compartments or pockets. This can be achieved by an inspection of changes in two-way travel time above the reservoir region. It has been found that a lowering of reservoir pressure by depletion in a limited size reservoir results in an increase of two-way travel time. If, however, specific areas are found above the reservoir wherein the two-way travel time changes are significantly lower or even negative, this represents an indication that the pressure in the reservoir area underneath the specific area has not decreased as much as in other parts of the reservoir region.

It is also possible with the method of the present invention to determine if a vertical or inclined fault that is seen in the seismic data is sealing or non-sealing with regard to fluid passage and pressure continuity across the fault. If the two-way travel time changes above the fault show a discontinuity across the fault, and in particular when the two-way travel time change changes sign, then this is an indication that the fault is sealing so that different pressures prevail at either side of the fault.

Figure 7:
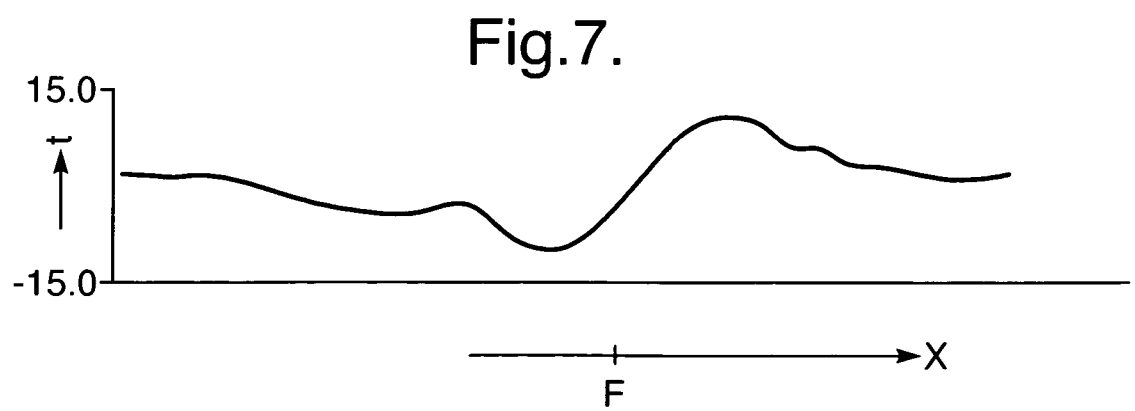
FIG. 7 shows the stress field in the formation of FIG. 2 as calculated by a geomechanical model.

FIG. 7 shows an example of the change of two-way travel time t (in ms) across a sealing fault. The Figure illustrates that a change of the sign of the time shift is observed over the fault at position F.

In this way, specific patterns of changes in two-way travel time, in particular above the reservoir region, can be used to identify specific conditions in the reservoir region. Using a library of typical patterns ('fingerprints'), a qualitative interpretation of certain conditions in time-lapse seismic data can be achieved. A particularly important fingerprint is a sharp lateral change in overburden time shifts at compartment boundaries, indicative for the transition from a "hanging arch" above a depleting area to an adjacent supporting area. Searching for such sharp lateral changes allows mapping boundaries of pressure compartments in depleting reservoirs.

Suitably, the analysis of time-lapse seismic data is supported by geomechanical simulation of the subsurface formation. Therein a starting model of the subsurface formation for the situation at the time of the base survey is used. The model suitably includes a geometrical model of the regions and region boundaries in the subsurface formation at the first point in time. The geometrical model suitably includes the reservoir region, the overburden up to surface (including any sea water layer if applicable), the underburden, and the formation regions laterally surrounding the reservoir region ("sideburden"). Suitably the depth of the underburden below the reservoir region and the width of the sideburden adjacent to the reservoir region that is included in the model is least 1.5 times the horizontal extension of the reservoir region. The geometrical model is built on the basis of all available information, e.g. from the base seismic survey, wellbore drilling and logging. The model suitably includes specific layers, discontinuities and faults.

The geomechanical simulation further requires an estimate of mechanical rock properties of each region in the geometrical model. Elastic and visco-elasto-plastic properties of the reservoir rock can e.g. be derived from tests on core plugs, such as triaxial tests at a range of constant ratio of radial to axial total stress, and uniaxial tests. Hold periods can be included during the tests at various stress levels to get parameters for the viscous behaviour. From the tests it can be determined whether rock behaviour can be assumed to be linear elastic for the anticipated stress changes, or if it would be visco-elastic or elastoplastic. In a linear elastic model it is sufficient to consider pressure changes, whereas absolute pressures and stresses at the beginning and the end of the time-lapse seismic survey should be taken into account as well when the behaviour is not linear.

Where no core is available, such as often the case for the overburden rock, elastic properties can be derived from sonic or seismic velocities. Special attention is suitably given to the assessment of stiffness contrast between layers and to the spatial variation of rock compressibility over the reservoir using spatial interpretation of well logs within the static (geometrical) model, as this has a large effect on stress distribution in both reservoir and surrounding regions. Rock compressibility can be calibrated against radio active bullet or radio active tag measurements and platform movement data.

Initial stresses and pore pressures for the non linear elasto-plastic and visco elasto-plastic calculations, i.e. stresses and pore pressures in the formation prior to depletion, can be estimated from density logs (vertical initial stress), from microfrac tests, leak off tests and experienced drilling losses (horizontal initial stress), from formation tester measurements (such as Schlumberger Oilfield Service's MDT, Baker Atlas' RCI or Halliburton's RFT instruments), drilling gains, and where appropriate from sonic and seismic velocity anomalies (initial pore pressure).

The change in pore pressure and saturation within the reservoir can be obtained from reservoir simulation, which should be calibrated as good as possible against field observed pressure and production data. A number of scenarios can be provided to cater for the uncertainties about water drive and compartmentalisation.

With the geometric model, rock properties, initial stresses and initial pore pressures (if appropriate) and change in pore pressures, 3D geomechanical simulations can provide a spatial distribution of stress changes throughout the reservoir, overburden, underburden and side burden regions, and of the displacement of layer boundaries.

The calculated stress and/or strain changes and displacements in combination with pressure and saturation changes found in the reservoir model can then be used to calculate a synthetic seismic response, and in particular to determine a geomechanical representation of the change in a predetermined seismic parameter such as two-way travel time. A change in the stress field can cause time-shifts in the non-reservoir rocks by changing the physical distance to a reflection boundary because of compaction, and because of changes in the rock velocity. Within the reservoir interval there is an additional effect due to the change in the saturation. The time shift observed as a function of depth will be the cumulative result of these effects integrated over depth.

For converting stress changes into time shifts, stress-velocity relations are used that can be derived from combining lab measurements with information from time-lapse VSP/checkshots and time lapse logging, where necessary with final scaling against the time lapse seismic. Geomechanical simulations confirm the effects discussed with reference to FIGS. 4-6.

The geomechanical representation of changes in the seismic parameter can then be compared with the seismic representation of the changes in the parameter, in order to interpret the time-lapse seismic survey. Geomechanically modelled and seismically measured time shifts can be harmonised by iteratively adjusting of geometry (in particular faults), rock compressibility and/or pore pressure distribution (in particular reservoir compartmentalisation and position of the gas-water contact). This harmonisation is very much facilitated by typical time shift patterns that are observed in time lapse seismic data and that are representative for certain stress conditions (so called time-lapse seismic fingerprints). E.g., an edge of the reservoir or a sealing fault separating reservoir compartments with different pore pressure show up as a time shift discontinuity, a sharp transition from positive to negative time shifts above the edge or fault, as a result of a stress arching induced sharp transition from positive to negative stress changes as discussed above.

The amplitude and decay length of this time shift discontinuity away from the edge or fault can give information on reservoir thickness, rock compressibility or pore pressure contrast. Another example of a typical time-shift pattern can be found above less or undepleted pockets in the reservoir or sections with less compressible or thinner reservoir rock. These sections are stress attractors, and therefore exhibit a negative or less positive time shift.

Therefore, specific conditions such as heterogeneities, undepleted pockets etc in the reservoir are often much better traceable through the travel time changes that they cause in the overburden, and also through effects in the sideburden and underburden, than in the reservoir itself.

Results of geomechanical modelling complementing the time-lapse time survey displayed in FIG. 2 are shown in FIGS. 8 and 9. FIG. 8 displays the difference in total vertical stress on a gray scale, wherein areas of (increasing) compressional stress difference are (increasingly) black and for the sake of clarity marked by "−" signs, and areas of extensional stress difference are (increasingly) white, and marked by "+" signs. FIG. 8 is an example of a geomechanical representation of the change in a predetermined seismic parameter.

FIG. 9 shows the calculated time shift on a gray scale utilizing seismic data, wherein the same conventions are used as in FIG. 3. In comparing FIGS. 8 and 9, there is good agreement between geomechanical and seismic representation of two-way travel time, in that the time shifts increase in a vertical band crossing the reservoir region, and that negative time shifts are observed in the sideburden. It was also found that most of the time-shifts are observed outside of the reservoir region, above as well as below the reservoir region as shown in FIG. 4.

Since the effects extend over distances much larger than the height of the reservoir, larger time windows can be used in determining the time shift τ by cross-correlation (cf. parameter g in equation 3). The time correlation window can e.g. be chosen as 240 ms, much longer than the 15-30 ms that would have been used before. This increases the robustness of the method.

In the examples discussed above the case was considered that production from a reservoir region results in a decrease in pore pressure. It will be understood that the pore pressure in some instances can also increase, e.g. as a consequence of water injection, and also in this case complementary stress variations and changes in seismic parameters can be observed outside the reservoir region.

The improved interpretation of time-lapse seismic surveys and the geomechanical and reservoir models that were found to be consistent with this interpretation can be used to extrapolate to future periods of field life.

The invention claimed is:

1. A method of investigating a reservoir region in a subsurface formation using a time-lapse seismic survey, wherein said subsurface formation comprises a further formation region adjacent to the reservoir region, said method comprising the steps of:
    obtaining data from a time-lapse seismic survey from a source and receiver, including seismic data of the subsurface formation at a first point in time and a later point in time;
    processing the seismic data to obtain a seismic representation of change in a predetermined seismic parameter in the further formation region, said seismic parameter being dependent on stress in the further formation;
    interpreting the seismic representation of change in the seismic parameter in the further formation region for an indication of changes of stress distribution in the further formation region caused by a change in a property of the reservoir region;
    deriving the change in the property of the reservoir region from the indication of change of stress distribution in the further formation region; and
    storing or displaying the change in the property of the reservoir region.

2. The method according to claim 1, wherein the seismic data is processed to obtain a seismic representation of the subsurface formation, wherein the formation region is identified, and wherein the seismic representation of the subsurface formation in the reservoir region is interpreted together with the indication of changes of stress distribution in the further formation region in order to derive the property of the reservoir region.

3. The method according to claim 2, wherein in the step of interpreting the seismic representation of change in the seismic parameter comprises conducting a geomechanical simulation of the subsurface formation.

4. The method according to claim 3, wherein the change in the property of the reservoir region comprises a change in a pore pressure, and wherein conducting the geomechanical simulation comprises:
    a) selecting a geomechanical model of the subsurface formation, said model including:
        a geometrical model of regions and boundaries between regions, including the reservoir and further formation region of the subsurface formation at the first point in time,
        an estimate of mechanical rock properties of each region in the geometrical model,
        an estimate of stress and/or strain in the reservoir region and in the further formation region at the first point in time,
    estimating the change in pore pressure between the first and the later point in time, in the reservoir region;
    b) performing the geomechanical simulation of the subsurface formation based on the geomechanical model of the subsurface formation and the estimated change in pore pressure, to obtain a representation of changes in stress and/or strain in the reservoir region and in the further formation region, and of displacements of region boundaries;
    c) converting the representation of stress and/or strain parameters and of displacements into a geomechanical representation of changes in the seismic parameter;
    d) comparing the seismic representation of changes in the seismic parameter from the time-lapse seismic survey and the geomechanical representation of changes in seismic response according to step c)
    so as to do at least one of the following:
        validate the geomechanical model of the subsurface formation,
        determine an updated geomechanical model of the subsurface formation, and/or
        determine an improved estimate of the change in pore pressure at a plurality of points in the reservoir region.

5. The method according to claim 4, further comprising the step of determining an improved representation of the change of changes in stress and/or strain in the reservoir region and in the further formation region, and of displacements of region boundaries.

6. The method according to claim 5, wherein the seismic representation of changes in the seismic parameter is interpreted by comparing it with a predetermined library of specific patterns of changes in the seismic parameter outside the reservoir region and indicative of a specific condition in the reservoir region.

7. Method according to claim 6, wherein the further formation region comprises at least one of: the region above the reservoir region, the region below the reservoir region, and a region laterally adjacent to the reservoir region.

8. Method according to claim 7, further comprising conducting of a reservoir simulation.

9. Method according to claim 8, wherein the absolute value of the pore pressures at the plurality of points is estimated.

10. Method according to claim 9, wherein the predetermined seismic parameter is selected from a group consisting of seismic velocity, two-way travel time and seismic amplitude.

11. The method according to claim 9, wherein the predetermined seismic parameter is selected from a group consisting of seismic velocity and two-way travel time.

12. The method according to claim 1, wherein in the step of interpreting the seismic representation of change in the seismic parameter comprises conducting a geomechanical simulation of the subsurface formation.

13. The method according to claim 12, wherein the change in the property of the reservoir region comprises a change in a pore pressure, and wherein conducting the geomechanical simulation comprises:
  a) selecting a geomechanical model of the subsurface formation, said model including:
     a geometrical model of regions and boundaries between regions, including the reservoir and further formation region of the subsurface formation at the first point in time,
     an estimate of mechanical rock properties of each region in the geometrical model,
     an estimate of stress and/or strain in the reservoir region and in the further formation region at the first point in time,
     estimating a change in pore pressure between the first and the later point in time, in the reservoir region;
  b) performing a geomechanical simulation of the subsurface formation based on the geomechanical model of the subsurface formation and the estimated change in pore pressure, to obtain a representation of changes in stress and/or strain in the reservoir region and in the further formation region, and of displacements of region boundaries;
  c) converting the representation of stress and/or strain parameters and of displacements into a geomechanical representation of changes in the seismic parameter;
  d) comparing the seismic representation of changes in the seismic parameter from the time-lapse seismic survey and the geomechanical representation of changes in seismic response according to step c)
  so as to do at least one of the following:
     validate the geomechanical model of the subsurface formation,
     determine an updated geomechanical model of the subsurface formation, and/or
     determine an improved estimate of the change in pore pressure at a plurality of points in the reservoir region.

14. The method according to claim 1, wherein interpreting the seismic representation of change in the seismic parameter comprises comparing the seismic representation with a predetermined library of specific patterns of changes in the seismic parameter outside the reservoir region being indicative of a specific condition in the reservoir region.

15. The method according to claim 1, wherein the further formation region comprises at least one of: the region above the reservoir region, the region below the reservoir region, and a region laterally adjacent to the reservoir region.

16. The method according to claim 1, wherein the predetermined seismic parameter is selected from a group consisting of seismic velocity, two-way travel time and seismic amplitude.

17. The method according to claim 1, wherein the property of the of the reservoir region comprises a pore pressure.

18. The method according to claim 1, wherein the further formation region comprises an overburden.

19. A method of investigating a reservoir region in a subsurface formation using a time-lapse seismic survey, wherein said subsurface formation comprises a further formation region adjacent to the reservoir region, said method comprising the steps of:
  obtaining data from a time-lapse seismic survey from a source and receiver, including seismic data of the subsurface formation at a first point in time and a later point in time;
  processing the seismic data to obtain a seismic representation of change in a predetermined seismic parameter selected from a group consisting of seismic velocity in the further formation region and two-way travel time in the further formation region, said predetermined seismic parameter being dependent on stress in the further formation;
  interpreting the seismic representation of change in the seismic parameter in the further formation region for an indication of changes of stress distribution in the further formation region caused by a change in a property of the reservoir region;
  deriving the change in the property of the reservoir region from the indication of change of stress distribution in the further formation region; and
  storing or displaying the change in the property of the reservoir region.

20. A method of investigating a reservoir region in a subsurface formation using a time-lapse seismic survey, wherein said subsurface formation comprises a further formation region adjacent to the reservoir region, which further formation region comprises an overburden, said method comprising the steps of:
  obtaining data from a time-lapse seismic survey from a source and receiver, including seismic data of the subsurface formation at a first point in time and a later point in time;
  processing the seismic data to obtain a seismic representation of change in a predetermined seismic parameter in the further formation region, said seismic parameter being dependent on stress in the further formation;
  interpreting the seismic representation of change in the seismic parameter in the further formation region for an indication of changes of stress distribution in the further formation region, due to local compacting of the reservoir region, comprising a curved distribution of stress caused by the overburden transferring its weight to non compacting or less compacting formation regions laterally surrounding the reservoir region;
  deriving the change in the property of the reservoir region from the indication of change of stress distribution in the further formation region; and
  storing or displaying the change in the property of the reservoir region.

* * * * *